(12) United States Patent
Wang et al.

(10) Patent No.: US 8,842,885 B2
(45) Date of Patent: Sep. 23, 2014

(54) CAMERA DEVICE AND INFORMATION PROMPT METHOD FOR DISTANCE MEASUREMENT

(75) Inventors: Yuancheng Wang, Beijing (CN); Honglei Zhu, Beijing (CN); Hai Chi, Beijing (CN); Lu Lu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 966 days.

(21) Appl. No.: 12/246,629

(22) Filed: Oct. 7, 2008

(65) Prior Publication Data

US 2009/0097716 A1   Apr. 16, 2009

(30) Foreign Application Priority Data

Oct. 10, 2007 (CN) .......................... 2007 1 0175672

(51) Int. Cl.
| | | |
|---|---|---|
| G03B 3/00 | (2006.01) | |
| G03B 13/00 | (2006.01) | |
| G06K 9/00 | (2006.01) | |
| G06K 9/46 | (2006.01) | |
| G06K 9/66 | (2006.01) | |
| G06K 9/36 | (2006.01) | |

(52) U.S. Cl.
USPC ............ 382/106; 382/194; 382/286; 396/104

(58) Field of Classification Search
USPC ................................................ 382/106–118
See application file for complete search history.

(56) References Cited

U.S. PATENT DOCUMENTS 4,625,329 A    11/1986    Ishikawa et al.

(Continued)

FOREIGN PATENT DOCUMENTS

| | | |
|---|---|---|
| CN | 101033955 A | 9/2007 |
| DE | 198 24 260 A1 | 12/1998 |
| FR | 2870948 | 12/2005 |
| JP | 2007074364 A * | 3/2007 |

OTHER PUBLICATIONS

Preliminary Search Report issued by France Patent Office for French Patent Application No. FR 08 56789, dated Sep. 23, 2013.

(Continued)

*Primary Examiner* — Amir Alavi
*Assistant Examiner* — Kenny Cese
(74) *Attorney, Agent, or Firm* — Sills Cummis & Gross P.C.

(57) ABSTRACT

The invention discloses a camera device that contains an image capture module for capturing image data including a user; an information processing module for obtaining human face image data from the image data, and obtaining a distance information between a human face corresponding to the human face image data and the camera device according to the human face image data; a decision module for determining whether the distance corresponding to said distance information is less than a predetermined value, and generating a prompt information while the distance corresponding to said distance information is less than a predetermined value; and a prompt output module for outputting said prompt information based on said distance information, said prompt information is configured to give a prompt to said user. The invention also discloses an information prompt method. The technical solution of the present invention can obtain and output a distance between a human face and the camera device, so as to prevent and prompt that a user is too close to a display screen, and thereby protect eyesight of the user.

12 Claims, 5 Drawing Sheets

(56) References Cited

U.S. PATENT DOCUMENTS

| | | | |
|---|---|---|---|
| 6,483,485 B1* | 11/2002 | Huang et al. .................... 345/10 |
| 7,978,883 B2 | 7/2011 | Rouh et al. |
| 2004/0190888 A1* | 9/2004 | Miwa ............................ 396/106 |
| 2005/0180611 A1* | 8/2005 | Oohashi et al. ............... 382/118 |
| 2005/0220450 A1 | 10/2005 | Enomoto et al. |
| 2005/0270410 A1* | 12/2005 | Takayama .................... 348/345 |
| 2006/0160616 A1* | 7/2006 | Kato et al. ...................... 463/30 |
| 2006/0208169 A1 | 9/2006 | Breed et al. |
| 2007/0248281 A1* | 10/2007 | Super et al. ................... 382/275 |
| 2008/0050108 A1* | 2/2008 | Mizutani et al. .............. 396/104 |
| 2008/0089557 A1* | 4/2008 | Iwaki et al. ................... 382/106 |

OTHER PUBLICATIONS

English language translation of Abstract of French Patent No: 2870948 (A1).

\* cited by examiner

CAMERA DEVICE AND INFORMATION PROMPT METHOD FOR DISTANCE MEASUREMENT

BACKGROUND OF THE INVENTION

1. Field of Invention

The present invention relates to information processing, particularly to a camera device and an information prompt method, which are capable of obtaining and outputting a distance between a human face and the camera device, so as to prompt that a user is too close to a display screen to prevent the user from getting too close to the screen. It protects eyesight of the user, convenient to use and is flexible, producing no radiation to a human body. Also, the device is easy to manufacture and is extendable.

2. Description of Prior Art

With the development of computers, people work before a monitor screen for an increasingly long time. Watching the screen for a long time tends to cause tiredness of eyes. Furthermore, some people, especially teenagers are accustomed to watch the screen closely, which may hurt their eyesights. The reason is that when people view information of texts, pictures or videos on the screen, the smaller the distance between the eyes and the screen is, the stronger the irradiation strength of the monitor to the eyes is, and consequently the stronger the stimulation to the eyes is. Therefore, it may cause the eyesight to deteriorate if the eyes focus on the screen in a close range for a long time. Also, a tiredness of the eyes will be caused.

The current eyesight protection products only focus on preventing the distance between the student and a desk from getting too close when he is reading. But there is no product for preventing the eyes from getting too close to a computer screen.

SUMMARY OF THE INVENTION

In order to overcome the above problem, an object of the present invention is to provide a camera device and an information prompt method, which are capable of obtaining and outputting a distance between a human face and the camera device, so as to prompt that a user is too close to a display screen to prevent the user from getting too close to the screen. It protects eyesight of the user, convenient to use and is flexible, producing no radiation to a human body. Also, the device is easy to manufacture and is extendable.

According to one aspect of the present invention, a camera device is provided. The camera device comprises: an image capture module for capturing image data including a user; an information processing module for obtaining human face image data from the image data, and obtaining a distance information between a human face corresponding to the human face image data and the camera device according to the human face image data; a decision module for determining whether the distance corresponding to said distance information is less than a predetermined value, and generating a prompt information while the distance corresponding to said distance information is less than a predetermined value; and a prompt output module for outputting said prompt information based on said distance information, said prompt information is configured to give a prompt to said user.

According to another aspect of the present invention, an information prompt method is provided. The information prompt method comprises: image capture step of capturing image data including a user by a camera device; information processing step of obtaining human face image data from the image data and obtaining a distance information between a human face corresponding to the human face image data and the camera device according to the human face image data; decision step of determining whether the distance corresponding to said distance information is less than a predetermined value and generating a prompt information while the distance corresponding to said distance information is less than a predetermined value; and prompt output step of outputting said prompt information based on said distance information, said prompt information is configured to give a prompt to said user.

According to the present invention, the distance between the human face and the camera device is obtained by utilizing the human image data taken by the camera device, so that a device for detecting the human face is not needed, consequently avoiding possible radiation to the human body that may caused by a detection device. According to the obtained distance between the human face and the camera device, corresponding prompt information is outputted, so that the sequential processing may prompt the user timely to prevent his eyes from being too close to the computer screen, protecting the eyesight of the user. The information processing module may be implemented in hardware or software, with a high flexibility and simplicity of manufacture and is extendable.

DETAILED DESCRIPTION OF PREFERRED EMBODIMENTS

Hereinafter, the present invention will be further described in detail with reference to the drawings and the embodiments in order to make the objects, technical scheme and advantages of the present invention apparent.

Figure 1:
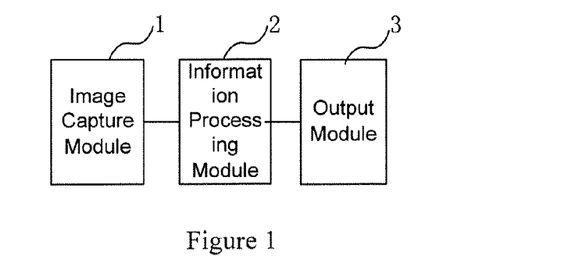
FIG. 1 is an illustrative block diagram of a camera device according to a first embodiment of the present invention.

FIG. 1 is an illustrative block diagram of a camera device according to a first embodiment of the present invention.

As illustrated in FIG. 1, the camera device comprises an image capture module 1 for capturing image data; an information processing module 2 for identifying human face image data in the image data obtained by the image capture module 1, and obtaining a distance between a human face and the camera device according to the human face image data;

and an output module 3 for outputting corresponding information according to a processing result of the information processing module 2.

When corresponding drivers are installed in the camera device, information such as pupils of the eyes, and human image. in front of the camera device may be identified and tracked. When the user is using the computer, the human image obtained by the camera device (such as a camera) is a frontal image of the face of the user.

In this embodiment, according to the human image data obtained by the camera device which is generally arranged for the computer currently, a distance between the corresponding human face and the camera device is obtained (e.g. when the camera device is arranged on the computer monitor) and corresponding information is outputted. For example, the corresponding information is outputted to the computer or other processing devices, in order to facilitate the computer or other processing devices to prompt the user when the obtained distance between the human face and the camera device is less than a predetermined value (e.g. less than 40 cm, such a safety distance may vary due to different sizes of the monitors). Thus, the embodiment may help people protect the eyesight without any device for detecting the human face which may produce radiation to the human body. When it is determined that the distance between the human face and the camera device is less than the predetermined value, corresponding prompt information is outputted, so that the user is prompted timely to prevent his eyes from being too close to the computer screen, in order to protect the eyesight of the user. The information processing module may be implemented in hardware or software, with a high flexibility and simplicity of manufacture and is extendable.

Preferably, in the embodiment, the image capture module is an image sensor. The camera device is a camera.

Preferably, in the embodiment, the output module may comprise a distance output module for outputting the distance between the human face and the camera device obtained by the information processing module.

Preferably, in the embodiment, the camera device may further comprise a decision module for determining whether the distance between the human face and the camera device obtained by the information processing module is less than a predetermined value or not. The output module may further comprise a prompt output module for outputting corresponding prompt information in a case that the distance between the human face and the camera device obtained by the information processing module is determined to be less than the predetermined value by the decision module.

The prompt module may be implemented in an information prompt manner which is obvious to the skilled in the art. For example, the prompt module may comprise a voice prompt module for outputting voice prompt information; and/or an information display module connected to the display screen, for outputting prompt information to the display screen; and/or an indicator light.

Figure 2:
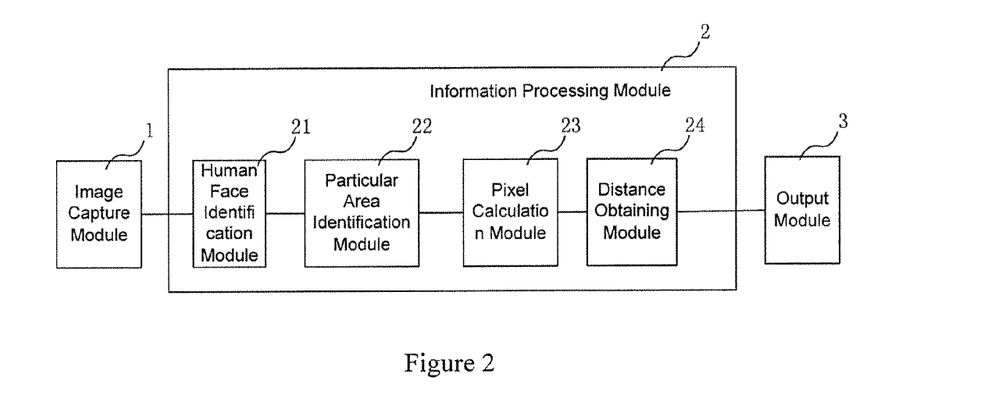
FIG. 2 is an illustrative block diagram of a camera device according to a second embodiment of the present invention.

FIG. 2 is an illustrative block diagram of a camera device according to a second embodiment of the present invention. As shown in FIG. 2, a camera device is provided in the second embodiment, which comprises:

an image capture module 1 for capturing image data;
an information processing module 2, comprising: a human face identification module 21 for identifying human face image data in the image data obtained by the image capture module; a particular area identification module 22 for identifying image data of a human face particular area in the human face image data identified by the human face identification module 21; a pixel calculation module 23 for calculating a number of pixels of the image data in the human face particular area identified by the particular area identification module 22; and a distance obtaining module 24 for obtaining a distance between a human face and the camera device corresponding to the number of the pixels calculated by the pixel calculation module 23, according to a corresponding relationship between a predetermined number of pixels of the image data in the human face particular area and the distance between the human face and the camera device; and an output module 3 for outputting corresponding information according to a processing result of the information processing module 2.

According to the second embodiment, it is further described that the number of the pixels is obtained by the human face identification and the particular area identification, and the distance between the corresponding human face and the camera device is obtained according to the number of the pixels, so that the prompt information is output timely when the distance is less than the predetermined value.

Preferably, in the embodiment, the information processing module 2 may further comprise a setting module connected to the distance obtaining module 24, which is for pre-storing or modifying a corresponding relationship between the predetermined number of the pixels of the image data in the human face particular area and the distance between the human face and the camera device. The corresponding relationship may be set, modified or expanded by the setting module flexibly and conveniently, thereby increasing the flexibility and applicability of the device.

Figure 3:
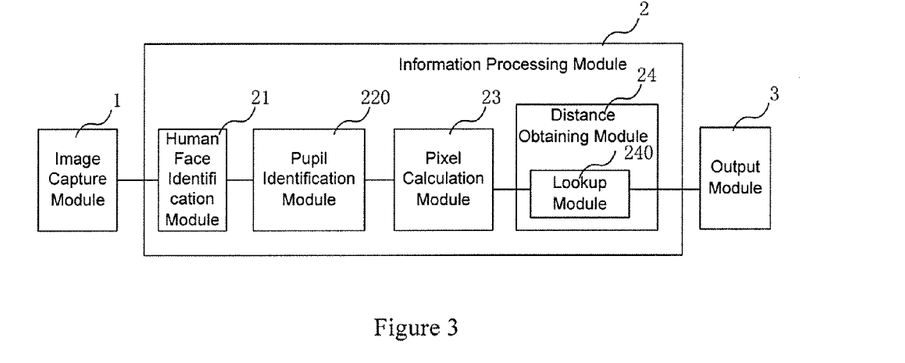
FIG. 3 is an illustrative block diagram of a camera device according to a third embodiment of the present invention.

FIG. 3 is an illustrative block diagram of a camera device according to a third embodiment of the present invention. As shown in FIG. 3, a camera device is provided in the third embodiment, which comprises:

an image capture module 1 for capturing image data;
an information processing module 2, comprising: a human face identification module 21 for identifying human face image data in the image data obtained by the image capture module; a pupil identification module 220 for identifying image data between the two pupils in the identified human face image data identified by the human face identification module 21; a pixel calculation module 23 for calculating a number of pixels of the image data between the two pupils identified by the pupil identification module 220; and a distance obtaining module 24 including a lookup module 240, for looking up a pre-stored distance corresponding to the number of the pixels calculated by the pixel calculation module 23; and an output module 3 for outputting corresponding information according to a processing result of the information processing module 2.

The pre-stored distance between the human face and the camera device corresponding to the number of pixels is a data table in a format as follows:

TABLE 1

| Number of Pixels | Distance between Human Face and Camera |
|---|---|
| 50 | 45 cm |
| 60 | 40 cm |
| 70 | 36 cm |

As illustrated in Table 1, the distances between two pupils of the eyes are similar (approximating to 7 cm) from one person to another. When the eyes are in a particular distance (e.g. 40 cm) from the camera, there are approximately 60 pixels between the two pupils in the image. Some factors such as an angle of view of the camera, physical number of pixels of a sensitization chip may affect the number of the pixels directly. These factors are fixed for a camera with a certain detailed configuration. When the distance between two pupils is determined, the number of the pixels between the two pupils is basically determined. The smaller the distance between the human face and the camera is, the larger the number of the pixels between the pupils is. The longer the distance between the pupils in the image, the larger the number of the pixels between the pupils is. In contrary, the smaller the distance between the human face and the camera is, the less the number of the pixels between the pupils is. The shorter the distance between the pupils in the image, the less the number of the pixels between the pupils is.

Additionally, the skilled in the art may also set the pre-stored distance between the human face and the camera device corresponding to the number of the pixels flexibly based on the requirement in an actual scenario. For example, a size of a human image is determined according to a width value of a shoulder of the human image in the image data captured by the camera device. Different distances between the human faces and the camera device corresponding to the number of the pixels may be set for different sizes of the human images.

As described above, in the third embodiment, one implementation of obtaining the distance between the human face and the display screen according to the number of pixels between the pupils in the identified human face image data is provided in detail, so that the distance between the eyes and the camera device is reflected accurately and then the camera device is set by the display screen of the computer, in order to detect whether the distance between the eyes and the display screen of the computer is less than the predetermined value or not.

Figure 4:
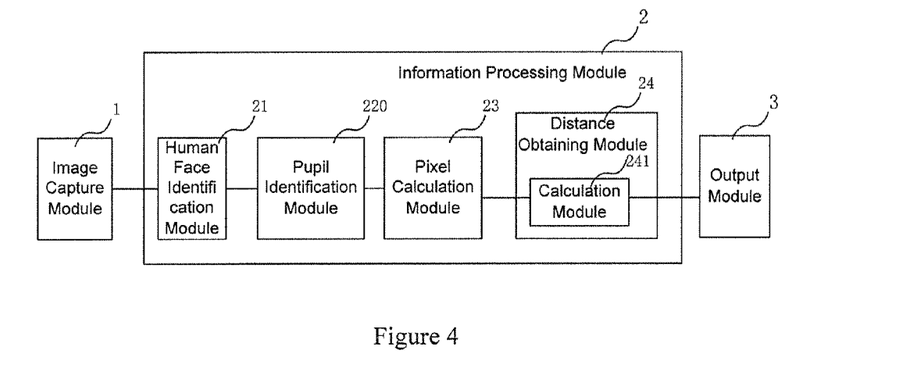
FIG. 4 is an illustrative block diagram of a camera device according to a fourth embodiment of the present invention.

FIG. 4 is an illustrative block diagram of a camera device according to a fourth embodiment of the present invention. As shown in FIG. 4, a camera device is provided in the third embodiment, which comprises:

an image capture module 1 for capturing image data;
an information processing module 2, comprising: a human face identification module 21 for identifying human face image data in the image data obtained by the image capture module; a pupil identification module 220 for identifying image data between the two pupils in the identified human face image data identified by the human face identification module 21; a pixel calculation module 23 for calculating a number of pixels of the image data between the two pupils identified by the pupil identification module 220; and a distance obtaining module 24 including a calculation module 241, for calculating a distance between the human face and the camera device corresponding to the number of the pixels calculated by the pixel calculation module 23, according to a predetermined calculation formula; and
an output module 3 for outputting corresponding information according to a processing result of the information processing module 2.

Preferably, in the embodiment, the calculation formula is as follows:

Distance between Human Face and Camera Device= (Number of Pixels−Reference Number of Pixels)×Coefficient+Reference Distance+Corrected Value.

Additionally, the skilled in the art may also set the calculation formula flexibly based on the requirement in an actual scenario. For example, a size of a human image is determined according to a width value of a shoulder of the human image in the image data captured by the camera device. Different calculation formulas may be set for different sizes of the human images.

In the fourth embodiment, another implementation of determining the distance between the human face and the display screen according to the number of pixels between the pupils in the identified human face image data is provided in detail. Specifically, the distance between the human face and the display screen corresponding to the number of the pixels is calculated by a predetermined calculation formula. According to different actual scenarios, parameters such as a reference distance, a corrected value, a coefficient, a reference number of pixels may be adjusted flexibly. The setting is convenient and has a better flexibility and expansibility.

Figure 5:
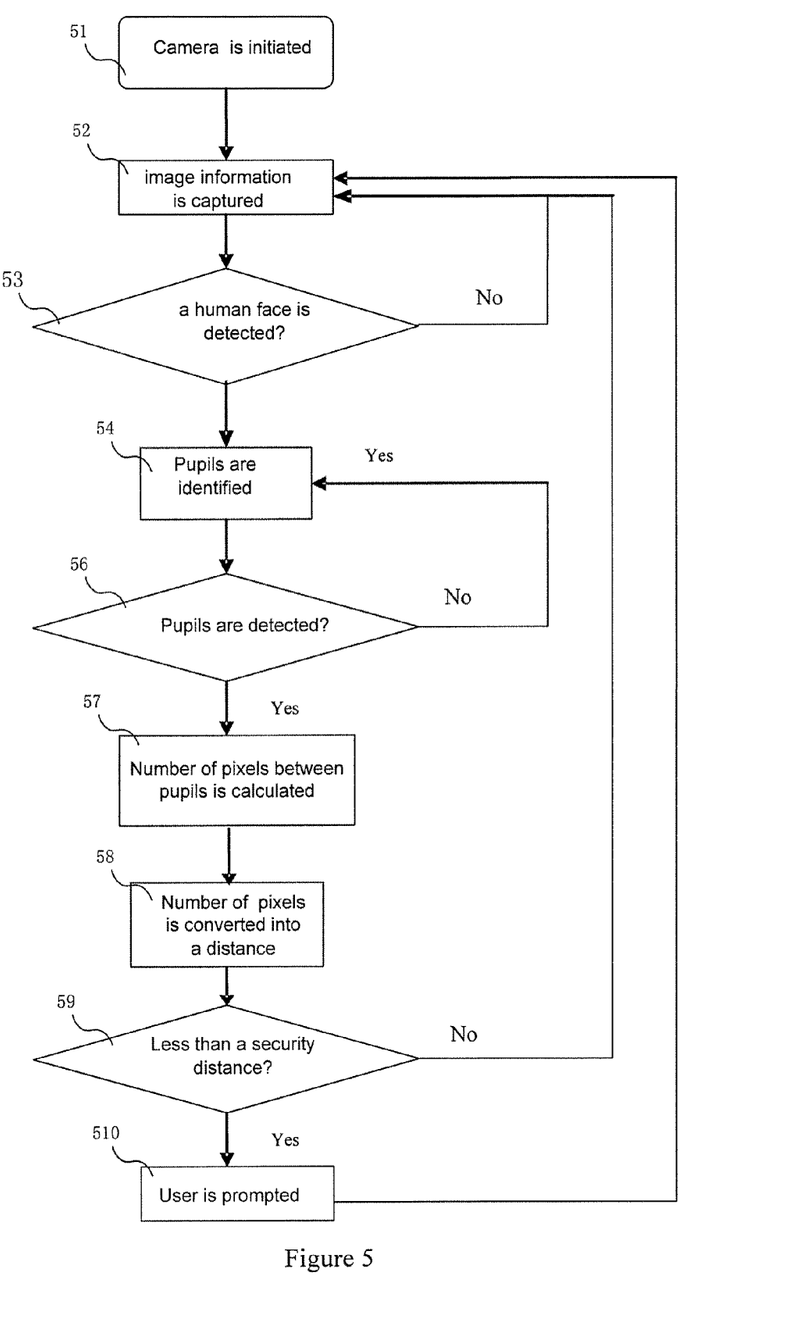
FIG. 5 is an illustrative processing flowchart of a camera device according to the present invention.

FIG. 5 is an illustrative processing flowchart of a camera device according to the present invention.

As shown in FIG. 5, after the camera function is initiated (51), the camera device captures the image information (52). The human face identification module determines whether a human face is detected according to the image information data (53) or not. If yes, the pupil identification module identifies pupils according to the image information data (54). If the pupils is identified, the number of pixels between pupils is calculated (57). Then, the number of the pixels is converted into a corresponding distance between the human face and the computer display screen according to the predetermined calculation formula (58). It is determined whether the distance is less than a predetermined value, i.e. a safety distance (59) or not. If yes, a prompt signal is output to the user (510) for prompting that the user is too close to the display screen. Thus, the eyesight of the user may be protected without any additional detection device.

Figure 6:
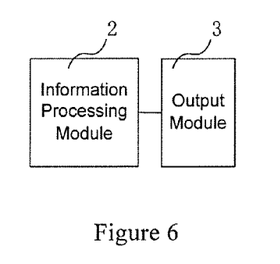
FIG. 6 is an illustrative block diagram of an information prompt device according to the first embodiment of the present invention.

FIG. 6 is an illustrative block diagram of an information prompt device according to the first embodiment of the present invention. In the embodiment, the information prompt device comprises: an information processing module 2 for identifying human face image data in the image data captured by the camera device, and obtaining a corresponding distance between the human face and the camera device according to the human image data; and an output module 3 for outputting corresponding information according to the processing result of the information processing module 2.

In this embodiment, according to the human image data obtained by the camera device which is generally arranged for the computer currently, a distance between the corresponding human face and the camera device is obtained (e.g. when the camera device is arranged on the computer monitor) and corresponding information is outputted. For example, the corresponding information is outputted to the computer or other processing devices, in order to facilitate the computer or other processing devices to prompt the user when the obtained distance between the human face and the camera device is less than a predetermined value (e.g. less than 40 cm, such a safety distances may vary due to different sizes of the monitors). Thus, the embodiment may help people take care of a healthy working manner and protect the eyesight without any device for detecting the human face additionally and any radiation to the human body; when it is determined that the distance between the human face and the camera device is less than the predetermined value, corresponding prompt information is outputted, so that the user is prompted timely to prevent his eyes from being too close to the computer screen, in order to protect the eyesight of the user. The information processing module may be implemented in hardware or software, with a high flexibility and simplicity of manufacture and is extendable.

Preferably, in the embodiment, the information processing module is connected to an image sensor in the camera device, for receiving image data captured by the image sensor. The camera device may be a camera.

Preferably, in the embodiment, the output module comprise a distance output module for outputting the distance between the human face and the camera device obtained by the information processing module.

Preferably, in the embodiment, the camera device further comprise a decision module for determining whether the distance between the human face and the camera device obtained by the information processing module is less than a predetermined value or not. The output module further comprise a prompt output module for outputting corresponding prompt information in a case that the distance between the human face and the camera device obtained by the information processing module is determined to be less than the predetermined value by the decision module.

The prompt module may be implemented in an information prompt manner which is obvious to the skilled in the art. For example, the prompt module may comprise a voice prompt module for outputting voice prompt information; and/or an information display module connected to the display screen, which is for outputting prompt information to the display screen; and/or an indicator light.

Figure 7:
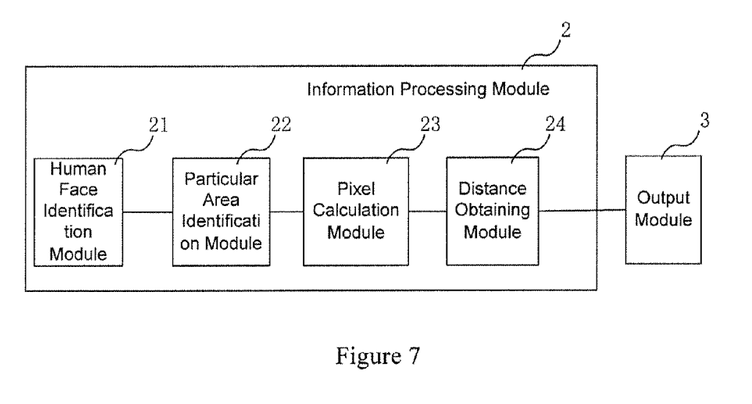
FIG. 7 is an illustrative block diagram of an information prompt device according to the second embodiment of the present invention.

FIG. 7 is an illustrative block diagram of an information prompt device according to the second embodiment of the present invention. As shown in FIG. 7, an information prompt device is provided in the embodiment, which comprises:

an information processing module 2, comprising: a human face identification module 21 connected to the camera device (not shown), for identifying human face image data in the image data obtained by the image capture module; a particular area identification module 22 for identifying image data of a human face particular area in the human face image data identified by the human face identification module 21; a pixel calculation module 23 for calculating a number of pixels of the image data in the human face particular area identified by the particular area identification module 22; and a distance obtaining module 24 for obtaining a distance between a human face and the camera device corresponding to the number of the pixels calculated by the pixel calculation module 23, according to a corresponding relationship between a predetermined number of pixels of the image data in the human face particular area and the distance between the human face and the camera device; and an output module 3 for outputting corresponding information according to a processing result of the information processing module 2.

According to the second embodiment, the number of the pixels may be obtained by the human face identification and the particular area identification. The distance between the corresponding human face and the camera device is obtained according to the number of the pixels, so that the prompt information is output timely when the distance is less than the predetermined value.

Preferably, in the embodiment, the information processing module 2 further comprise a setting module connected to the distance obtaining module 24, which is for pre-storing or modifying a corresponding relationship between the predetermined number of the pixels of the image data in the human face particular area and the distance between the human face and the camera device. The corresponding relationship may be set, modified or expanded by the setting module flexibly and conveniently, thereby increasing the flexibility and applicability of the device.

Figure 8:
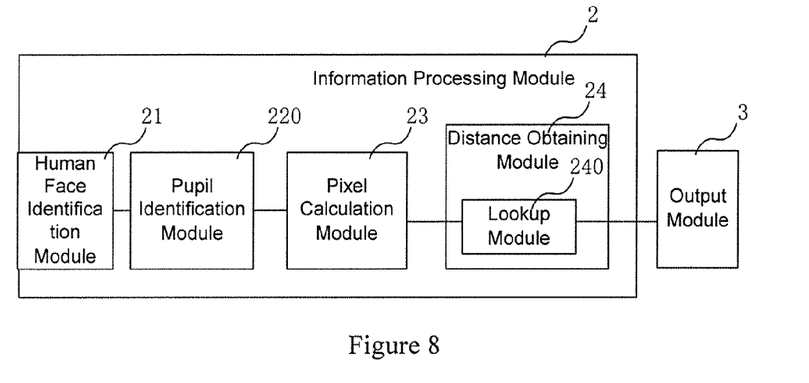
FIG. 8 is an illustrative block diagram of an information prompt device according to the third embodiment of the present invention.

FIG. 8 is an illustrative block diagram of an information prompt device according to the third embodiment of the present invention. As shown in FIG. 8, a camera device is provided in the third embodiment, which comprises:

an information processing module 2, comprising: a human face identification module 21 for identifying human face image data in the image data obtained by the camera device (not shown); a pupil identification module 220 for identifying image data between the two pupils in the identified human face image data identified by the human face identification module 21; a pixel calculation module 23 for calculating a number of pixels of the image data between the two pupils identified by the pupil identification module 220; and a distance obtaining module 24 including a lookup module 240, for looking up a pre-stored distance between the human face and the camera device corresponding to the number of the pixels calculated by the pixel calculation module 23; and an output module 3 for outputting corresponding information according to a processing result of the information processing module 2.

The pre-stored distance between the human face and the camera device corresponding to the number of pixels is a data table in a format as follows:

TABLE 2

| Number of Pixels | Distance between Human Face and Camera |
|---|---|
| 50 | 45 cm |
| 60 | 40 cm |
| 70 | 36 cm |

As illustrated in Table 2, the distances between two pupils of the eyes are similar (approximating to 7 cm). When the eyes are a particular distance (e.g. 40 cm) from the camera, there are approximately 60 pixels between the two pupils in the image. Some factors such as an angle of view of the camera, physical number of pixels of a sensitization chip may affect the number of the pixels directly. These factors are fixed for a camera with a certain detailed configuration. When the distance between two pupils is determined, the number of the pixels between the two pupils is basically determined. The smaller the distance between the human face and the camera is, the larger the number of the pixels between the pupils is. The longer the distance between the pupils in the image, the larger the number of the pixels between the pupils is. In contrary, the smaller the distance between the human face and the camera is, the less the number of pixels between the pupils is. The shorter the distance between the pupils in the image, the less the number of the pixels between the pupils is.

As described above, in the third embodiment, one implementation of obtaining the distance between the human face and the display screen according to the number of pixels between the pupils in the identified human face image data is provided in detail, so that the distance between the eyes and the camera device is reflected accurately and then the camera device is set by the display screen of the computer, in order to detect whether the distance between the eyes and the display screen of the computer is less than the predetermined value or not.

Figure 9:
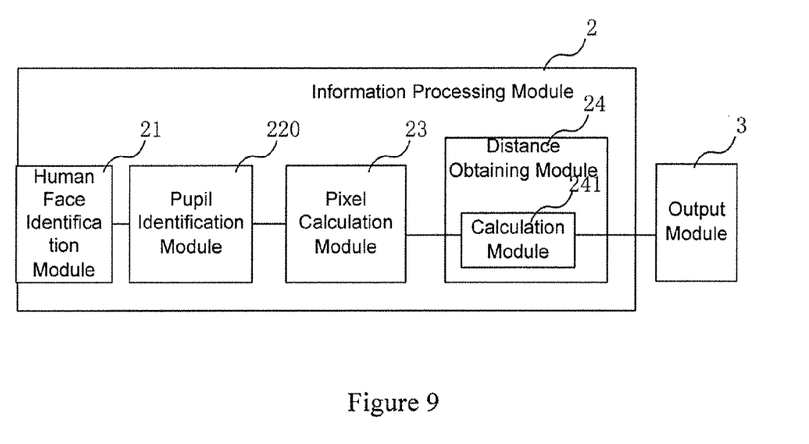
FIG. 9 is an illustrative block diagram of an information prompt device according to the fourth embodiment of the present invention.

FIG. 9 is an illustrative block diagram of an information prompt device according to the fourth embodiment of the present invention. As shown in FIG. 9, an information prompt device is provided in the fourth embodiment, which comprises:

an image capture module 1 for capturing image data;
an information processing module 2, comprising: a human face identification module 21 for identifying human face image data in the image data obtained by the image capture module; a pupil identification module 220 for identifying image data between the two pupils in the identified human face image data identified by the human face identification module 21; a pixel calculation module 23 for calculating a number of pixels of the image data between the two pupils identified by the pupil identification module 220; and a distance obtaining module 24 including a calculation module 241, which is for calculating a distance between the human face and the camera device corresponding to the number of the pixels calculated by the pixel calculation module 23, according to a predetermined calculation formula; and
an output module 3 for outputting corresponding information according to a processing result of the information processing module 2.

Preferably, in the embodiment, the calculation formula is as follows:

$$\text{Distance between Human Face and Camera Device} = (\text{Number of Pixels} - \text{Reference Number of Pixels}) \times \text{Coefficient} + \text{Reference Distance} + \text{Corrected Value}.$$

In the fourth embodiment, another implementation of determining the distance between the human face and the display screen according to the number of pixels between the pupils in the identified human face image data is provided in detail. Specifically, the distance between the human face and the display screen corresponding to the number of the pixels is calculated by a predetermined calculation formula. According to the different actual scenarios, parameters such as a reference distance, a corrected value, a coefficient, a reference number of pixels may be adjusted flexibly. The setting is convenient and has a better flexibility and expansibility.

The information prompt device provided in these embodiments may be arranged either inside the camera device, or independently outside the camera device and connected to the camera. It will be appreciated by the skilled in the art that the information prompt device may be arranged flexibly according to requirements for actual scenarios, which should fall within the scope of the invention defined by the claims.

It should be appreciated by the skilled in the art that the above embodiments of the present invention and the combination thereof or equivalents may be implemented by hardware or by a medium in which computer programs for executing operations according to the present invention are stored, which should fall within the scope of the invention defined by the claims.

The above is only the preferred embodiments of the present invention and the present invention is not limited to the above embodiments. Therefore, any modifications, substitutions and improvements to the present invention are possible without departing from the spirit and scope of the present invention.

What is claimed is:

1. A camera device comprising:
    an image capture module for capturing image data including a user;
    an information processing module for obtaining human face image data from the image data, and obtaining a distance information between a human face corresponding to the human face image data and the camera device according to the human face image data, wherein the information processing module comprises:
    a human face identification module for identifying human face image data in the image data obtained by the image capture module;
    a particular area identification module for identifying image data of a human face particular area in the human face image data identified by the human face identification module;
    a pixel calculation module for calculating a number of pixels of the image data in the human face particular area identified by the particular area identification module; and
    a distance obtaining module for obtaining a distance between a human face and the camera device corresponding to the number of the pixels calculated by the pixel calculation module,
    according to a predetermined corresponding relationship between the number of pixels of the image data in the human face particular area as well as the distance between the human face and the camera device;
    a decision module for determining whether the distance corresponding to said distance information is less than a predetermined value, and generating a prompt information while the distance corresponding to said distance information is less than a predetermined value; and
    a prompt output module for outputting said prompt information based on said distance information, said prompt information is configured to give a prompt to said user;
    wherein the particular area identification module is a pupil identification module for identifying image data between the two pupils in the identified human face image data identified by the human face identification module; and
    the pixel calculation module is for calculating a number of pixels of the image data between the two pupils identified by the pupil identification module;
    characterized in that the calculation formula is:

$$\text{Distance from Human Face to Camera Device} = (\text{Number of Pixels} - \text{Reference Number of Pixels}) \times \text{Coefficient} + \text{Reference Distance} + \text{Corrected Value}.$$

2. The camera device according to claim 1, characterized in that said prompt information is a voice prompt information, the prompt output module is a voice prompt module for outputting the voice prompt information.

3. The camera device according to claim 1, characterized in that said prompt information is a display prompt information, the prompt output module is an information display module connected to a display screen for outputting said display prompt information to the display screen.

4. The camera device according to claim 1, characterized in that the information processing module further comprises:
    a setting module connected to the distance obtaining module, for pre-storing or modifying a corresponding relationship between the predetermined number of the pixels of the image data in the human face particular area and the distance between the human face and the camera device.

5. The camera device according to claim 1, characterized in that the distance obtaining module includes a lookup module for looking up a pre-stored distance between the human face and the camera device corresponding to the number of the pixels calculated by the pixel calculation module.

6. The camera device according to, claim 1 characterized in that the distance obtaining module includes a calculation module for calculating a distance between the human face and the camera device corresponding to the number of the pixels calculated by the pixel calculation module, according to a predetermined calculation formula.

7. An information prompt method, comprising:
- image capture step of capturing image data including a user by a camera device;
- information processing step of obtaining human face image data from the image data and obtaining a distance information between a human face corresponding to the human face image data and the camera device according to the human face image data, wherein the information processing step comprises:
- human face identification step of identifying human face image data in the image data obtained in the image capture step;
- particular area identification step of identifying image data of a human face particular area in the human face image data identified in the human face identification step;
- pixel calculation step of calculating a number of pixels of the image data in the human face particular area identified in the particular area identification step; and
- distance obtaining step of obtaining a distance between a human face and the camera device corresponding to the number of the pixels calculated in the pixel calculation step, according to a predetermined corresponding relationship between the number of pixels of the image data in the human face particular area as well as the distance between the human face and the camera device;
- decision step of determining whether the distance corresponding to said distance information is less than a predetermined value and generating a prompt information while the distance corresponding to said distance information is less than a predetermined value; and
- prompt output step of outputting said prompt information based on said distance information, said prompt information is configured to give a prompt to said user;
- wherein the particular area identification step is a pupil identification step of identifying image data between the two pupils in the identified human face image data identified in the human face identification step; and
- the pixel calculation step is for calculating a number of pixels of the image data between the two pupils identified in the pupil identification step;
- characterized in that the calculation formula is:

Distance between Human Face and Camera Device= (Number of Pixels−Reference Number of Pixels)×Coefficient+Reference Distance+Corrected Value.

8. The information prompt method according to claim 7, characterized in that said prompt information is voice prompt information, and the voice prompt information is outputted in the prompt output step.

9. The information prompt method according to claim 7, characterized in that said prompt information is display prompt information, and the display prompt information is outputted in the prompt output step to a display screen.

10. The information prompt method according to claim 7, characterized in that the information processing step further comprises:
- setting step of pre-storing or modifying a corresponding relationship between the predetermined number of the pixels of the image data in the human face particular area and the distance between the human face and the camera device.

11. The information prompt method according to claim 7, characterized in that the distance obtaining step includes a lookup step of looking up a pre-stored distance between the human face and the camera device corresponding to the number of the pixels calculated in the pixel calculation step.

12. The information prompt method according to, claim 7 characterized in that the distance obtaining step includes a calculation step of calculating a distance between the human face and the camera device corresponding to the number of the pixels calculated in the pixel calculation step, according to a predetermined calculation formula.

* * * * *